(12) United States Patent
Nath et al.

(10) Patent No.: US 8,037,112 B2
(45) Date of Patent: Oct. 11, 2011

(54) EFFICIENT ACCESS OF FLASH DATABASES

(75) Inventors: Suman K. Nath, Redmond, WA (US); Aman Kansal, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 313 days.

(21) Appl. No.: 11/739,011

(22) Filed: Apr. 23, 2007

(65) Prior Publication Data

US 2008/0263114 A1    Oct. 23, 2008

(51) Int. Cl.
*G06F 12/00* (2006.01)
(52) U.S. Cl. ...................................................... 707/813
(58) Field of Classification Search .................. 707/813, 707/820
See application file for complete search history.

(56) References Cited

U.S. PATENT DOCUMENTS

| | | | |
|---|---|---|---|
| 5,794,242 A | 8/1998 | Green et al. | |
| 5,864,657 A | 1/1999 | Stiffler | |
| 6,154,877 A | 11/2000 | Ramkumar et al. | |
| 6,895,416 B2 | 5/2005 | Gara et al. | |
| 7,058,849 B2 | 6/2006 | Erstad | |
| 2002/0032835 A1* | 3/2002 | Li et al. ........................ | 711/114 |
| 2003/0038803 A1* | 2/2003 | Morein et al. ................ | 345/421 |
| 2005/0071336 A1 | 3/2005 | Najork et al. | |
| 2005/0187917 A1 | 8/2005 | Lawande et al. | |
| 2005/0253741 A1* | 11/2005 | McCartney et al. ............ | 341/50 |
| 2006/0101081 A1* | 5/2006 | Lin et al. ...................... | 707/200 |
| 2007/0061544 A1 | 3/2007 | Uppala | |
| 2007/0233683 A1* | 10/2007 | Verma et al. ...................... | 707/8 |
| 2008/0263061 A1* | 10/2008 | Nath et al. .................... | 707/100 |

OTHER PUBLICATIONS

Padala, "A Log Structured File System with Snapshots", at <<http://logfs.sourceforge.net/lfs.pdf>>, University of Michigan, Jul. 22, 2005, pp. 1-7.
Rosenblum, et al., "The Design and Implementation of a Log-Structured File System", at <<http://www.cs.berkeley.edu/~brewer/cs262/LFS.pdf>>, Proceedings of the 13th ACM Symposium on Operating Systems Principles, Oct. 1991, pp. 1-15.
Wu, et al., "An Efficient B-Tree Layer for Flash-Memory Storage Systems", at <<http://www.cis.nctu.edu.tw/~lpchang/papers/rtcsa03_btreeflash.pdf>>, The 9th Intl Cof on Real Time and Embedded Computing Systems and Applications (RTCSA 2003), 2003, pp. 1-20.
Yazti, et al., "MicroHash: An Efficient Index Structure for Flash-Based Sensor Devices", at <<http://www.cs.ucr.edu/~vana/microhash.pdf>>, In 4th USENIX Conf on Files and Storage Technologies (FAST 2005), Dec. 2005, 14 pages.

* cited by examiner

*Primary Examiner* — Pierre Vital
*Assistant Examiner* — Truong Vo
(74) *Attorney, Agent, or Firm* — Lee & Hayes, PLLC

(57) ABSTRACT

Techniques for efficient access to flash databases are described. In one implementation, a method includes performing an operation on a flash database, supplementing at least one portion of a node translation table corresponding to at least one node involved in the operation, and semantically compressing at least one portion of the node translation table. The semantic compression includes discarding at least one log entry that is rendered obsolete by at least one subsequent log entry, and incrementing a version number of the log entries corresponding to the at least one portion of the node translation table. In further embodiments, discarding at least one log entry includes discarding at least one log entry that is at least one of opposed by or overruled by at least one subsequent log entry.

10 Claims, 5 Drawing Sheets

EFFICIENT ACCESS OF FLASH DATABASES

CROSS-REFERENCE TO RELATED APPLICATIONS

This patent application is related to co-pending, commonly-owned U.S. patent application Ser. No. 11/739,018 entitled "Self-Tuning Index for Flash-Based Databases" filed concurrently herewith on Apr. 23, 2007, which application is incorporated herein by reference.

BACKGROUND

Current databases are typically designed for the storage and interface characteristics of hard-disk devices. An alternative form of storage device, however, is a flash device. While flash-based storage devices were not common in previous databases, recent technology improvements in flash device storage capacities have made the use of flash devices in databases more feasible. The increasing use of mobile and low power devices further motivates the use of flash devices in such mobile devices because hard disks may be prohibitively heavy or energy intensive.

A key feature of flash storage devices is that their characteristics vary depending on the interface used to access the flash device. A flash device may be accessed through many different interface types, such as in a USB (Universal Serial Bus) stick, in a compact flash card, a secure digital (SD) card, a mini-SD card, a micro-SD card, or in a printed circuit board of a mobile or embedded device. While speed of data transfer across the interface may not be a bottleneck, differences exist in the nature of low level flash management implemented behind the interface by the flash device manufacturer. The performance of the flash-based database and the underlying indexing algorithm depends on the characteristics of the flash device as observed through each specific interface.

There are many applications where it is desirable to store data within a sensor network, rather than transmit the data to a central database. Example applications include remote deployments where an economical communication infrastructure is not available, mobile sensor nodes with sporadic and short-lived connections, and sensor networks of mobile devices which have significant local processing power.

In many cases where data storage is part of a sensor network, flash-based storage devices are commonly used rather than hard disks due to their more favorable characteristics, including shock resistance, node size, weight, and energy considerations. Additionally, flash is also common in many mobile devices such as personal data assistants (PDAs), cell phones, music players, and personal exercise monitors. These devices may greatly benefit from the favorable characteristics of flash memory.

Existing database products, however, are typically designed for hard disks, and may therefore suffer from drawbacks when using flash devices. For example, such database products are typically not optimized for flash device characteristics, and unlike many traditional database applications, may be used in various applications for which the workload is highly write intensive. Indexing schemes have been proposed to address these concerns, however, existing indexing schemes are not optimized for many available flash devices or for many realistic workloads. In this way, existing indexing schemes may not be suitable in many practical systems, especially when the systems are designed to be highly flexible and capable of handling multiple types of workloads.

SUMMARY

Techniques for efficient access to flash databases are described. For a flash database having a data tree structure, an indexing scheme may include storing log entries involving the nodes of the data tree in a node translation table. Techniques described herein may improve the efficiency of accessing and storing the node translation table, as well as recovering the node translation table after a system crash.

In one embodiment, an operation is performed on a flash database, and a portion of a node translation table corresponding to at least one node involved in the operation is semantically compressed. The semantic compression includes discarding at least one log entry that is rendered obsolete by a subsequent log entry, and incrementing a version number of the log entries corresponding to the portion of the node translation table. In further embodiments, the log entry is discarded because it is opposed by or overruled by at least one subsequent log entry. In other embodiments, a portion of the node translation table may be checkpointed. The checkpointing may include replacing one or more sector addresses with one or more corresponding physical addresses, and storing the physical addresses.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical items.

DETAILED DESCRIPTION

Techniques for efficient access to flash databases are disclosed herein. For a flash database having a data tree structure, an indexing scheme may include storing log entries involving the nodes of the data tree in a node translation table. Embodiments of techniques in accordance with the teachings of the present disclosure may provide significant advantages. For example, processes in accordance with the present disclosure may advantageously reduce the size of the node translation table in the flash database memory, and may enable the flash memory to be accessed faster and more energy-efficiently. Such processes may also improve the ability of the flash memory to recover from crashes. Techniques in accordance with the teachings of the present disclosure may therefore improve the overall performance of flash memories, and therefore, the performance of the devices, sensor networks, and other components and systems that use flash memories.

Exemplary Environment

Figure 1:
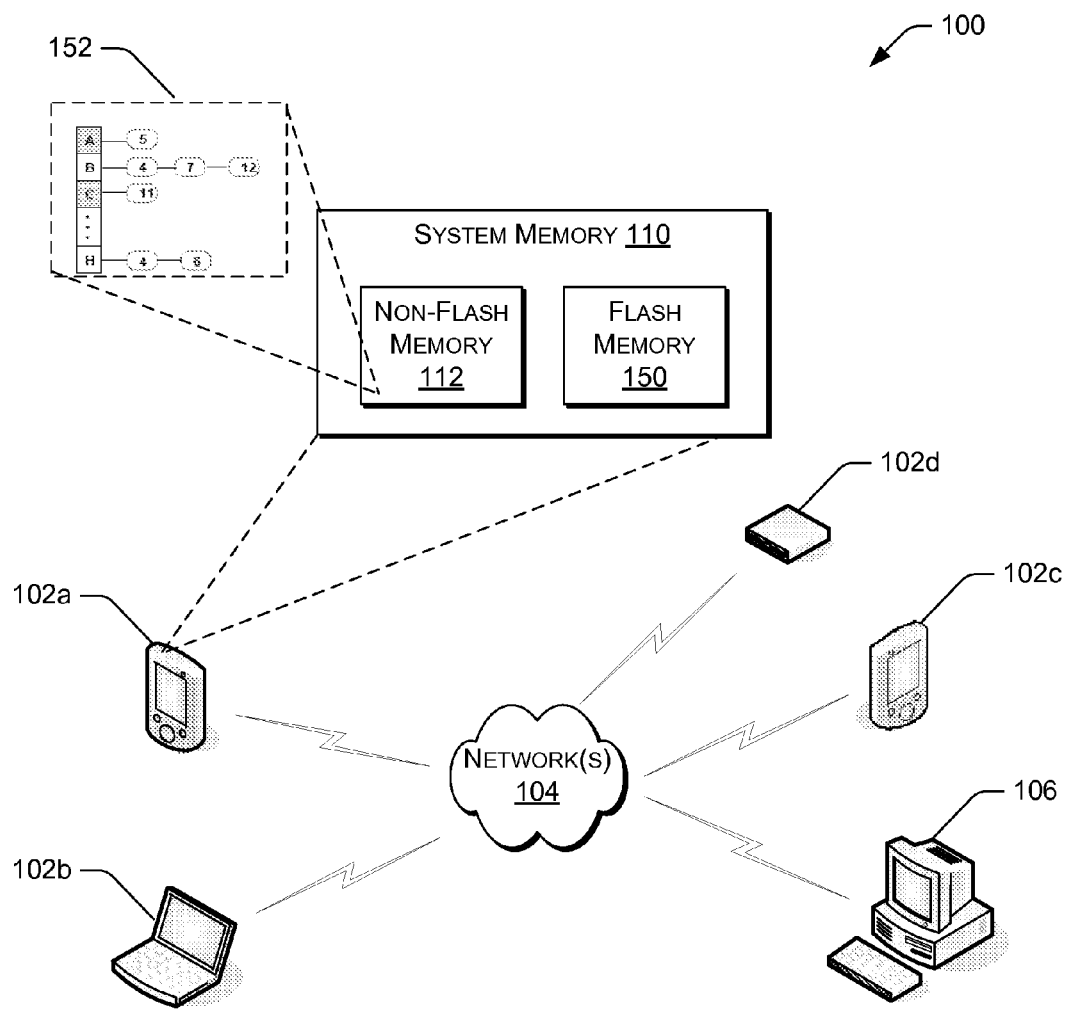
FIG. 1 illustrates an exemplary environment for implementing techniques to efficiently access flash databases.

FIG. 1 illustrates an exemplary environment 100 for implementing techniques to efficiently access log-structured indices. In this embodiment, the environment 100 includes a plurality of mobile devices 102 (e.g. personal data assistant (PDA) 102a, laptop (or tablet PC) 102b, cell phone 102c, media drive 102d). Each mobile device 102 is coupled by one or more networks 104 to one or more of the other mobile devices 102. A stationary device 106 (e.g. desktop computer) is also coupled to the mobile devices 102 via the network(s) 104. Of course, in alternate embodiments, the mobile devices 102 may include any suitable types of devices having flash memory, and the stationary device 106 may include any other suitable computers or devices.

Figure 3:
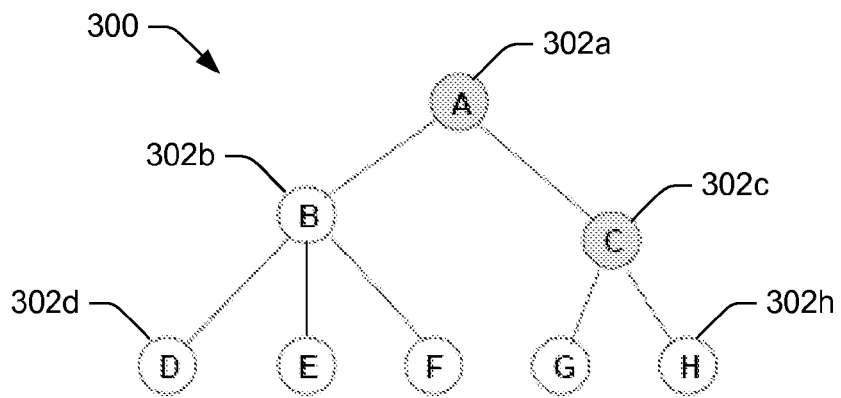
FIG. 3 shows a representative data tree for use in the flash database of FIG. 2.

As further shown in FIG. 1, at least one of the mobile devices 102 (e.g. a PDA 102a) includes a system memory 110 having a flash memory 150 and a non-flash memory 112. The flash memory 150 stores a data tree having a plurality of nodes (FIG. 3). A node translation table 152 resides in the non-flash memory 112 (e.g. in volatile RAM) and stores log entries associated with nodes of a data tree stored in the flash memory 150.

Techniques for efficient access to flash databases in accordance with the teachings of the present disclosure may be implemented in the system memory 110 of the device 102. More specifically, the system memory 110 may be configured to provide improved compactness of the node translation table 152 so that less space is required in memory. Such techniques may also significantly improve the efficiency of the memory operations associated with the node translation table 152 and the flash memory 150, thereby improving the energy consumption and overall robustness of the devices 102, as described more fully below.

Exemplary Device

Figure 2:
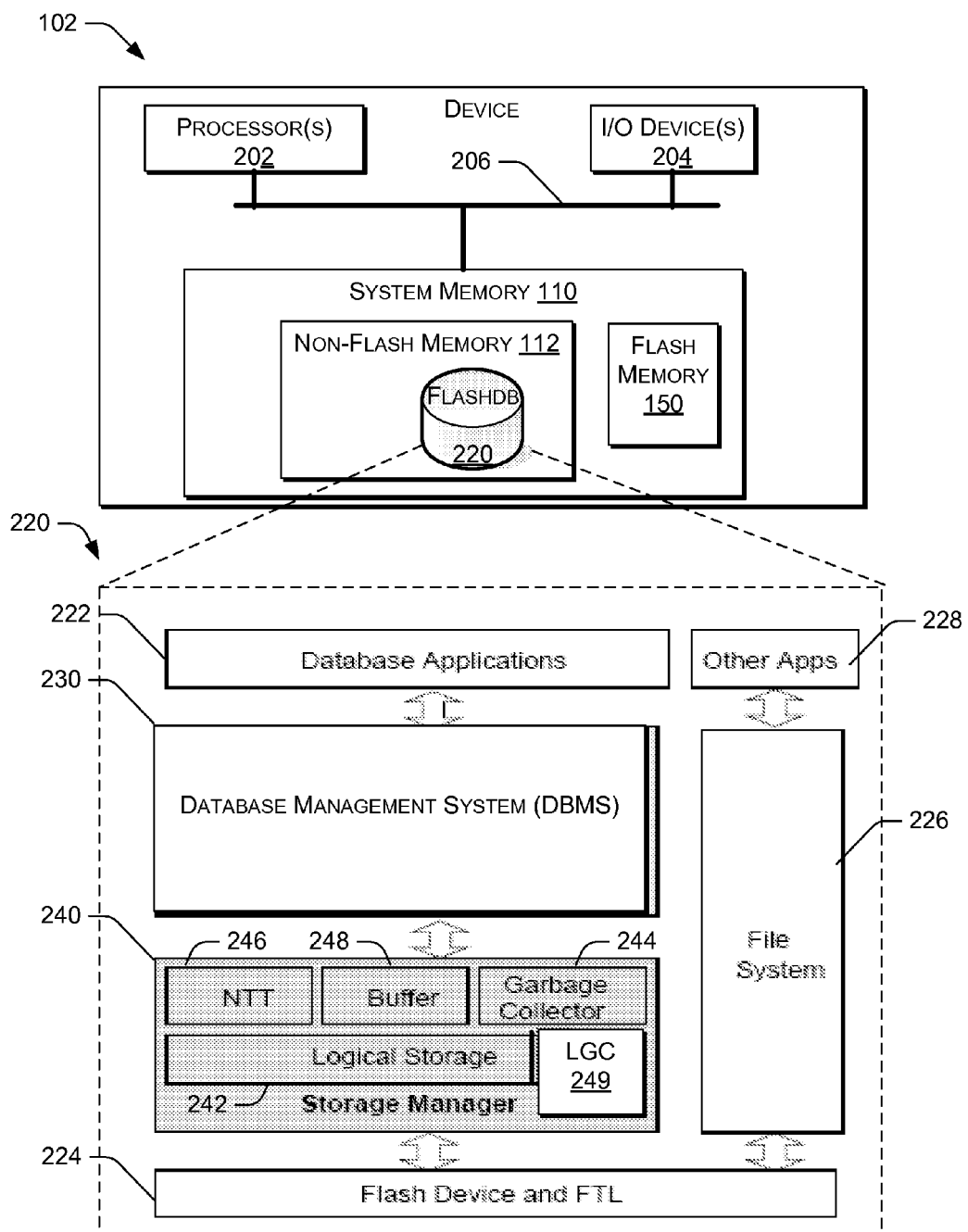
FIG. 2 shows an exemplary device having a flash memory configured to provide efficient access to a flash database.

FIG. 2 shows an exemplary device 102 having a flash memory 150 suitable for implementing techniques in accordance with the teachings of the present disclosure. In this embodiment, the device 102 includes one or more processors 202 and one or more input/output (I/O) components 204 (e.g., keyboard, mouse, transmitter, receiver, etc.) coupled to the system memory 110 by a bus 206. The system bus 206 represents any of the several types of bus structures, including a memory bus or memory controller, a peripheral bus, an accelerated graphics port, and a processor or local bus using any of a variety of bus architectures. The system memory 110 includes the flash memory 150 and the non-flash memory 112. The non-flash memory 112 may include any suitable type of non-flash memory, including volatile memory, such as Random Access Memory (RAM), and/or non-volatile memory, such as Read Only Memory (ROM).

A flash database (or FlashDB) 220 is stored in the non-flash memory 112. The FlashDB 220 is a database compatible with (and in some embodiments optimized for) flash devices. More specifically, in some embodiments, the FlashDB 220 may be of a "self-tuning" database such that after it is initially configured using the underlying storage device, it may automatically adapt its storage structure in a way that optimizes energy consumption and latency for the workload it experiences, as described for example in our co-pending, commonly-owned U.S. patent application Ser. No. 11/739,018 entitled "Self-Tuning Index for Flash-Based Databases," previously incorporated by reference. Thus, different flash databases running on different flash devices or having different workloads (e.g. with different read/write ratio or different data correlation) may choose different organizations of data on the underlying physical device.

In this embodiment, the FlashDB 220 includes a database management system 230 that implements one or more database functions (e.g. index manager, query planner, query compiler, etc.), and a storage manager 240 that implements efficient storage-related functionalities (e.g. data buffering and garbage collection). One or more database applications 222 communicate with a flash translation layer (FTL) 224 of a flash device (e.g. the flash memory 150) via the database management system 230 and the storage manager 240. One or more non-database applications 228 communicate with the FTL 224 of the flash device through a file system 226. The database management system 230 may operate in cooperation with a known data structure, such as a $B^+$-tree data structure.

Flash devices are primarily of two types: NOR and NAND. While NOR devices typically have faster and simpler access procedures, their storage capacities are typically lower, and hence NOR devices are typically preferred for program storage rather than data storage. NAND flash offers significantly higher storage capacity (e.g. 32 GB in a single chip) and is typically more suitable for storing large amounts of data.

In flash devices, read and write operations typically happen at page granularity (for some devices up to $\frac{1}{8}^{th}$ page granularity). Pages are organized into blocks, typically of 32 or 64 pages. A page can only be written after erasing the entire block to which the page belongs. Page write cost is typically higher then read. The block erase requirement makes writes even more expensive, since if a block is to be erased, then pages containing useful data within that block, must be moved to another block before erase. In addition, a block may wear out after repeated writes (e.g. 10,000 to 100,000 writes), and so it is desirable to spread out the write load evenly over the flash device.

The FTL 224 provides a disk-like interface to the flash device that includes the capability to read and write a page directly without worrying about the erase-before-write constraint. The FTL 224 also provides wear leveling by distributing writes uniformly across the media. Typically, the FTL 224 is implemented using a micro-controller within the flash storage device and is hidden behind the interface (such as compact flash, USB, SD) that is used to access the flash memory. However, the FTL 224 may be implemented on the processor and memory of the embedded device 102 in some cases.

As further shown in FIG. 2, the storage manager 240 includes a logical storage 242 that provides functionalities of an FTL for devices without an FTL (e.g., flash chip). Components of the FlashDB 220 that reside over the logical storage 242 may access sectors of the logical storage 242 through application programming interfaces (APIs). For example, in some embodiments, sectors of the logical storage 242 are accessed through two APIs, ReadSector and WriteSector, with a granularity of a sector of the same size as a physical flash page. Also, available addresses for writing may be obtained using another API (e.g. Alloc) and unused sectors freed using another API (e.g. Free).

The logical storage 242 may hide flash-specific complexities using an out-of-place update. In brief, it is known that a block is the smallest unit of erase operation in a NAND flash memory, while reads and writes are handled by pages. Because existing data on flash memory may not be overwritten (updated) unless it is erased first (i.e. in-place updating), it is typically more economical to not overwrite data on update, but rather, to write data to free space, and the older versions of data are then invalidated (or considered as dirty). This practice is known as out-of-place updating. Using out-of-place updating, when the API WriteSector (addr, data) is called, the logical storage 242 finds the next unused physical page p, writes data to it, and maintains a mapping from a logical address addr to a physical page p. The page previously mapped by addr is marked "dirty."

The mapping from the logical address addr to a physical page p required for out-of-place updating may be maintained using a structure table, labeled node translation table (NTT) 246 in FIG. 2, in the non-persistent random access memory. Techniques for efficient access to flash database indices in accordance with the teachings of the present disclosure may use various known indexing schemes. In further embodiments, techniques disclosed herein may also use a novel self-tuning indexing scheme that can adapt itself to the dynamic behavior of multiple device and workload parameters that affect performance, as described in our co-pending, commonly-owned U.S. patent application Ser. No. 11/739, 018 entitled "Self-Tuning Index for Flash-Based Databases," previously incorporated by reference.

With continued reference to FIG. 2, the storage manager 240 also includes a garbage collector 244 that cleans dirty pages produced by the logical storage 242. Since a page cannot be erased independently, the garbage collector 244 first chooses a flash block containing dirty pages. Then valid pages of the block are copied to another block, and finally, the block is erased.

The storage manager 240 may be configured with a partition (not shown) of the physical storage space. Other non-database applications 228 bypassing the storage manager 240 using, for example, the file system 226, operate outside this partition. The storage manager partition can be grown or shrunk dynamically. Growing the partition does not affect existing data. Subsequent API operations (e.g. Alloc and WriteSector) take this additional physical space into account. Shrinking the partition, however, typically requires remapping used sectors and copying their data to pages within the new partition.

As further shown in FIG. 2, the storage manager 240 also includes a node translation table (NTT) 246, a log buffer 248, and a log garbage collection (LGC) component 249. The functionalities of these components will be described below in association with an index structure used by the FlashDB 220.

The data stored on the flash is organized using an index tree. More specifically, FIG. 3 shows a representative index tree 300 to store data. In this embodiment, the data tree 300 includes a plurality of index nodes 302 configured in a B⁺-tree data structure. In general, the B⁺-tree data structure is a popular indexing data structure known for efficiently supporting queries and operations, and used in various incarnations in different database systems. When an operation is performed on an index node 302 of the index tree 300, each node update operation (e.g. adding or deleting keys) is written as a separate log entry. Thus, to read a node, all its log entries (which may be spread over multiple sectors) need to be read and parsed.

Referring once again to FIG. 2, the log buffer 248 of the storage manager 240 is used only by the index nodes 302 currently in Log mode. When an index node 302 in Log mode is modified, the corresponding entries are temporarily held in the log buffer 248. The log buffer 248 may be flushed to flash when the log buffer 248 has approximately one sector worth of data, advantageously helping to avoid relatively expensive small writes.

Figure 4:
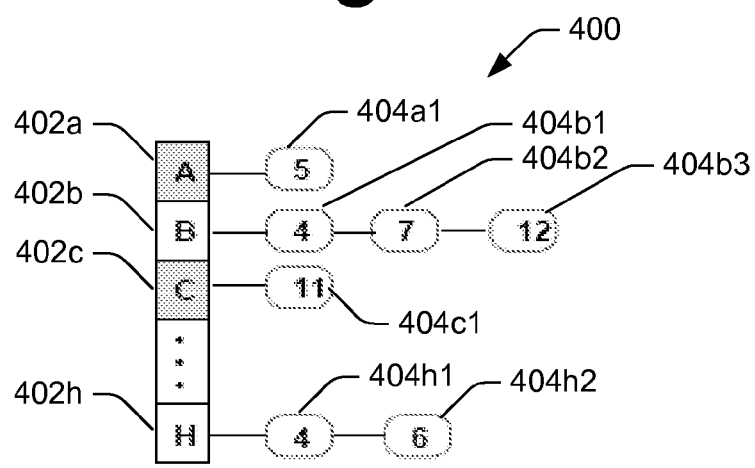
FIG. 4 shows a representative node translation table corresponding to the data tree of FIG. 3.

As previously noted, the mapping from the logical address addr to a physical page p required for out-of-place updating is maintained using a table denoted NTT 246. The node translation table (NTT) 246 of the storage manager 240 maintains the mapping between the index nodes 302 to their physical representations. For example, FIG. 4 shows a portion 400 of the NTT 246 for the data tree 300 of FIG. 3. In this embodiment, the NTT portion 400 includes a list 402 corresponding to each of the index nodes 302 of the data tree 300. Each sub-list, such as 402a, within 402 corresponds to a single node and includes one or more addresses 404.

The list 402a for the node 302a contains the addresses 404a of the entries relevant to the node 302a. More specifically, for some nodes, such as the index node 302a, the NTT 246 records the addresses of a single sector (e.g. address=5) where the index node 302a is written on flash, and for other nodes, the NTT 246 maintains a plurality of addresses of all the sectors (or pages) that contained at least one valid log entry for that node. For example, for the index node 302b, the corresponding list 402b contains three addresses 404b, indicating that the node 302b has at least one log entry in sector 4 (address 404b1), sector 7 (address 404b2), and sector 12 (address 404b3). In brief, the NTT portion 400 maintains a list 402 corresponding to each index node 302 of the index tree 300.

Figure 5:
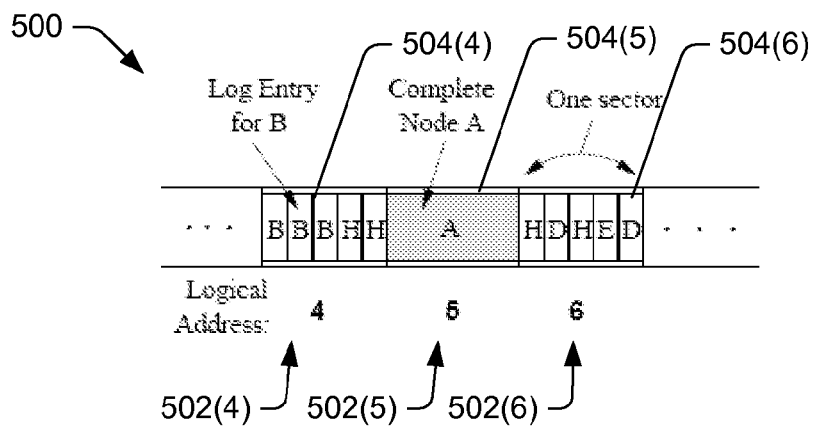
FIG. 5 shows an exemplary portion of a flash storage corresponding to the node translation table of FIG. 4.

A sector (or page) containing log entries of one index node may also contain log entries for other index nodes. For example, FIG. 5 shows an exemplary portion of a flash storage 500 suitable for implementing techniques in accordance with the teachings of the present disclosure. The flash storage portion 500 includes three sectors 502 (e.g sectors 4, 5, and 6), and each sector 502 includes one or more log entries 504 corresponding to various index nodes 302 of the data tree 300. In the representative embodiment shown in FIG. 5, the fourth sector 502(4) includes log entries for two index nodes (index node 302(b) and index node 302(h)), and the sixth sector 502(6) also contains log entries for to index nodes (index node 302(h) and index node 302(d)). The fifth sector 504(5) includes log entries for a single index node 302(a). Comparison of the log entries 504 shown in FIG. 5 with the addresses 404 shown in FIG. 4 (e.g. sector 4 contains log entries for index nodes 302b and 302h) reveals the correlation between the NTT portion 400 and the flash storage portion 500.

Generally, program modules executed on the device 102 (FIGS. 1 and 2) may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise computer storage media that includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, including paper, punch cards and the like, which can be used to store the desired information and which can be accessed by a computer.

Having described an exemplary environment 100 and an exemplary device 102 in which techniques in accordance with the present disclosure may be implemented, exemplary processes for efficiently accessing flash databases will be described in the following section.

Exemplary Processes for Accessing Flash Databases

As is generally known, database operations such as key search, addition, and deletion on a data tree 300 of the type shown in FIG. 3 translate to create, read, and update of the index nodes 302. Given the node translation table (NTT) 400 shown in FIG. 4, we perform these node-level operations as described below.

To create a node with an identifier x, an entry is created with the identifier x in the NTT 400. To read or update the node x, we read the node from or update to the sectors given by the corresponding list 402 for the node x. More specifically, in a log-structured index, to update a node x, a log entry is constructed for the update operation and placed into the log buffer 248 (FIG. 2). Later, when the log buffer 248 has approximately one sector worth of data, all the log entries in the log buffer 248 are written to an available sector. In some embodiments, the available sector is provided by an API (e.g. Alloc) of the logical storage 242 (FIG. 2). The address 404 of the sector is then added to the linked list 402x corresponding to the node x into NTT 400 (FIG. 4). To read the node x, the log buffer 248 is read, and then all the sectors in the linked list 402x are read to collect log entries for the node x and parse the logs to construct the logical node.

Log Compaction and Semantic Compression

In building an index, an index node 302 of the data tree 300 can get updated many times, resulting in a large number of log entries potentially spread over a large number of sectors on flash. This has two disadvantages. First, it makes each of the lists 402 of the node translation table (NTT) 400 (FIG. 4) long and increases the memory footprint of the NTT. Second, it becomes more expensive (resource intensive) to read the node 302 since a large number of sectors are read.

Figure 6:
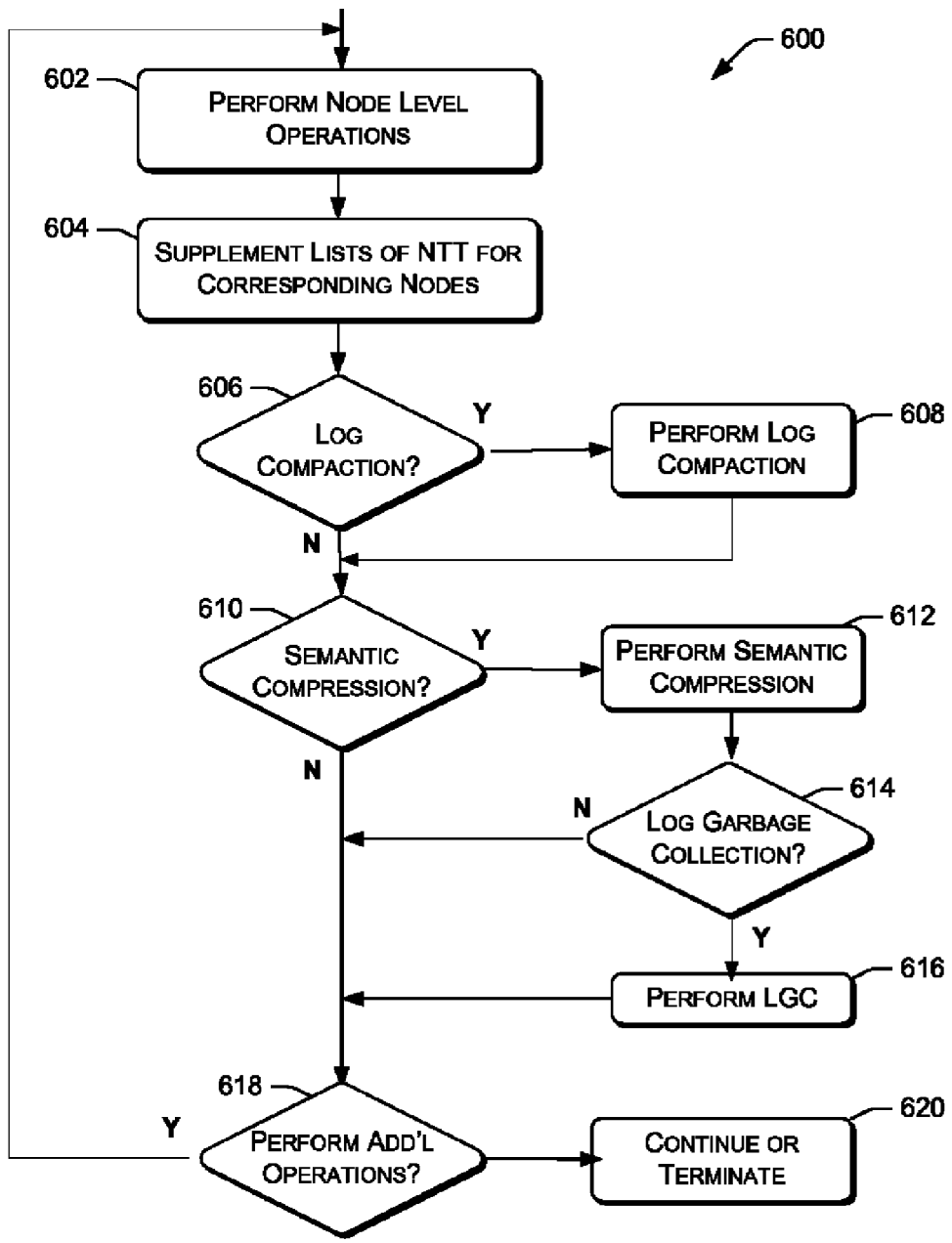
FIG. 6 is a flow diagram of an exemplary process for accessing a flash database.

To overcome these concerns, a conventional log compaction may be used. In addition, a process disclosed herein called "semantic compression" may also be used. For example, FIG. 6 is a flow diagram of an exemplary process 600 for accessing a flash database in accordance with the teachings of the present disclosure. The process 600 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 600 is described with reference to the exemplary components described above with reference to FIGS. 1 through 5.

As shown in FIG. 6, one or more node level operations (e.g. create, read, update, etc.) are performed at 602, and the corresponding lists 402 of the NTT 400 are supplemented at 604. At 606, a determination is made whether to perform log compaction. Typically, the determination may be made based on a log compaction threshold on available space on the storage device; for example, when the storage device is 90% full. If it is determined that log compaction is desired at 606, the process 600 performs log compaction at 608.

In log compaction at 608, all the log entries for a particular node 302 are read and then written back to a small number of new sectors. This is helpful, since log entries for the node 302 may share sectors with log entries of other nodes, and hence provides the opportunity to be clustered into a fewer number of sectors. An upper bound on the number of sectors required for a node 302 cannot be predetermined, since the number of log entries for a node 302 can grow indefinitely over time. As described below, semantic compression is intended to address this concern.

As shown in FIG. 6, if it is determined at 606 that log compaction is unnecessary, or after log compaction is performed at 608, the process 600 determines whether semantic compression is desired at 610. The determination whether to perform semantic compression may be made based on a semantic compression threshold on the number of log entries for the node 302; for example, when the node 302 has more than 32 log entries, it can be semantically compressed.

If semantic compression is desired, then semantic compression is performed at block 612. In semantic compression, log entries having opposite semantics are discarded during compaction. For example, if a data item k is added to the node x, and then deleted from it later (e.g. after a node split operation after the node x becomes full), the node x will have log entries "ADD_KEY k" and "DELETE_KEY k." Since the subsequent log entry opposes the earlier log entry, these two log entries cancel each other and may therefore be discarded. Similarly, multiple "UPDATE_POINTER" log entries for the node x may be replaced by (overruled by) a subsequent log entry. Other examples of log entries having opposite semantics may be conceived, and semantic compression is not limited to the particular examples of opposite semantics recited above.

For semantic compression, the sequence number of the log entries must be considered such that the logs are applied in proper order. It may be shown that if a node can contain at most n data items, it will have at most n+1 log entries, bounding the size of the linked list in node transition table (NTT) 246 to be (n+1)/entries per sector. Semantic compression is greatly facilitated by log entries having a version number which is incremented after each semantic compression. After compression, the NTT 246 is updated with the current sector address list. During subsequent reads, log entries of older versions are ignored.

Semantic compression introduces stale log entries (having older version numbers), and the log garbage collection (LGC) component 249 (FIG. 2) may be used to reclaim the space. Therefore, the process 600 determines whether log garbage collection using the LGC component 249 is desired at 614.

Note that the LGC component 249 is different from the garbage collector 244. The garbage collector 244 reclaims spaces from dirty pages, while the LGC component 249 reclaims spaces from dirty log entries. The LGC component 249 may be activated, for example, when the flash is low in available space (e.g. when the storage manager 240 fails to allocate a new sector). In some embodiments, the LGC component 249 may reside within the storage manager 240 as shown in FIG. 2. In alternate embodiments, however, the LGC component 249 may reside in any other suitable portion of the database architecture 220.

If log garbage collection is desired, the LGC component 249 performs log garbage collection at 616. The LGC component 249 may begin by scanning the whole flash. For each sector, the LGC component 249 first looks at the sector's header information to determine if the sector contains log entries. Such sectors are termed Log sectors. For each Log sector, the LGC component 249 counts the fraction of stale log entries in that sector. If the fraction is above a threshold value, the sector is selected for garbage collection. The LGC component 249 and then writes the fresh log entries to the log buffer 248, removes the sector address from the NTT 246, and returns the sector to the storage manager 240. The log buffer 248 eventually flushes the log entries to flash and adds the new addresses to the NTT 246.

As further shown in FIG. 6, if it is determined that semantic compression is not desired at 610 (or after semantic compression is performed at 612, or after LGC is performed at 616), the process 600 determines whether additional node level (or database) operations are to be performed at 618. If so, the process 600 returns to performing node level operations at 602, and the above-described activities may be repeated indefinitely. Alternate, if no additional operations are desired at 618, the process 600 continues or terminates at 620.

Checkpoint and Rollback

Occasionally, a crash occurs such that the information in the in-memory node translation table 246 is lost. Typically, the log entries in the flash database 220 contain enough information such that even if the application crashes and loses its in-memory NTT 246, the NTT 246 can be reconstructed. Thus, existing methods of recovering from such a crash typically involve scanning the entire flash to reconstruct the in-memory NTT 246. This process of recovering the in-memory NTT is expensive (resource intensive).

Techniques in accordance with the present disclosure provide improved processes for recovering from crashes and reconstructing NTT 246 using checkpointing and rollback. Checkpointing allows a device to capture the state of an index, while rollback allows the device to go back to a previously checkpointed state. These techniques may advantageously help the device 102 deal with software bugs, hardware glitches, energy depletion, and other possible faults in the environment 100.

Figure 7:
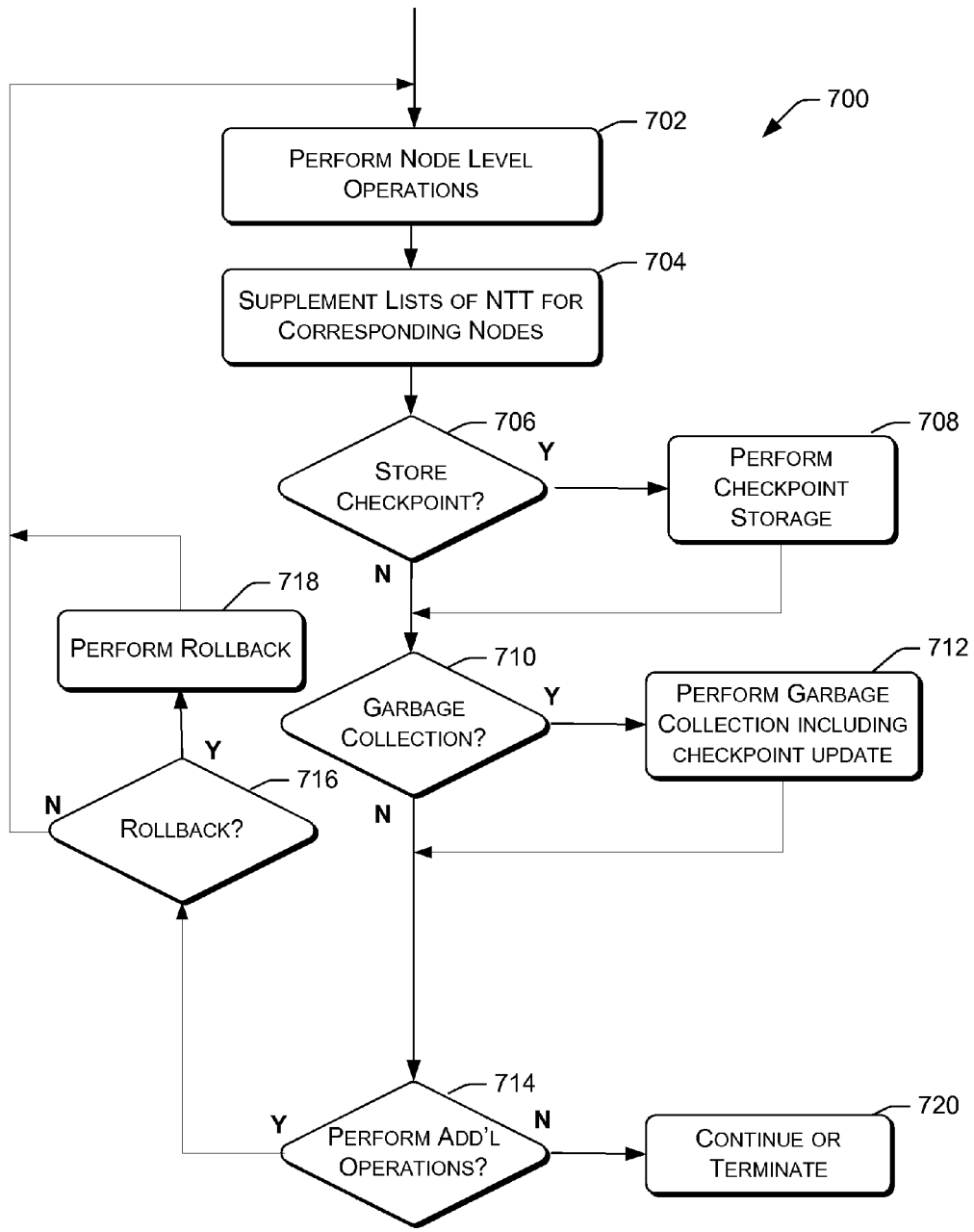
FIG. 7 is a flow diagram of another exemplary process for accessing a flash database.

For example, FIG. 7 is a flow diagram of another exemplary process 700 for accessing a flash database in accordance with the teachings of the present disclosure. Again, the process 700 is illustrated as a collection of blocks in a logical flow graph, which represents a sequence of operations that can be implemented in hardware, software, or a combination thereof.

At 702, one or more node level operations are performed, and the corresponding lists 402 of the NTT 400 are supplemented at 704. At 706, a determination is made whether to perform a checkpoint storage. Typically, the determination may be made based on a checkpoint threshold. For example, the checkpointing process may be periodic so that the system periodically (e.g. once every hour) checkpoints its state. If it is determined that checkpoint storage is desired at 706, the process 700 performs the checkpoint storage at 708.

Checkpointing (at 708) requires making both in-memory states and in-flash data persistent. Simply storing the node translation table may not be sufficient due to logical storage and garbage collection functions in the storage manager 240. One consideration is that the NTT 246 keeps track of logical addresses of sectors, and the logical storage 242 may change the mapping between logical to physical addresses over time. So, if a later rollback operation loads a previously checkpointed node translation table, physical pages currently mapped by sector addresses in NTT 246 may not be the same ones mapped during that checkpoint time. To address this, during checkpointing (at 708) the sector addresses in NTT are replaced with their physical addresses, and the physical addresses are stored.

As further shown in FIG. 7, a determination is made at 710 whether to perform garbage collection. If garbage collection is desired, then it is performed at 712. Another consideration important to checkpointing is that garbage collection may copy the content of the page p to a new location p' and erase p. If p is part of a checkpointed version, however, a future rollback operation will fail to find the data for p (which is now in p). To address this, during garbage collection, the checkpointed NTT is updated with p'. Note that it is not necessary to update the whole NTT, only the page containing p needs updating. Moreover, garbage collection is an infrequent operation, so the amortized cost is small. Since updating in-flash NTT is expensive, blocks with no checkpointed data are preferred over the ones having checkpointed data for garbage collection.

The process 700 determines whether additional operations are to be performed at 714. If so, the process 700 proceeds to determine whether a rollback is needed at 716. If so, a rollback is performed at 718. Rollback requires loading the NTT into memory, creating new logical addresses in logical storage 242 at an active physical addresses and in-flash NTT, and placing the logical addresses in the restored NTT in memory. The process then returns to performing node level operations at 702, and the above-described activities may be repeated indefinitely. Alternate, if no additional operations are desired at 714, the process 700 continues or terminates at 720.

Techniques in accordance with the teachings of the present disclosure may provide significant advantages. For example, processes in accordance with the present disclosure may reduce the size of the node translation table in the flash database memory, and may enable the flash memory to be accessed faster and more energy-efficiently. Such processes may also improve the ability of the flash memory to recover from crashes. Techniques in accordance with the teachings of the present disclosure may therefore improve the overall performance of flash memories, and of the devices that use flash memories.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
performing an operation on a flash database;
periodically determining to semantically compress at least one portion of a node translation table corresponding to at least one node involved in the operation, the determining being based on a semantic compression threshold comprising a number of log entries for the at least one node involved in the operation, the semantic compression including:
counting a number of stale log entries in a sector; and
performing a log garbage collection on the sector when a fraction of the number of stale log entries in the sector is greater than or equal to a threshold value, the log garbage collection including:
discarding at least one stale log entry that is rendered obsolete by at least one subsequent log entry;
writing at least one fresh log entry to a log buffer;
flushing the at least one fresh log entry from the log buffer to a new location in the flash database;
adding a new address, corresponding to the new location, for the at least one fresh log entry to the node translation table;
removing an address for the sector from the node translation table; and
returning the sector to a storage manager as reclaimed space; and
checkpointing at least another portion of the node translation table including replacing one or more sector addresses with one or more corresponding physical addresses, and storing the physical addresses.

2. The method of claim 1, wherein the at least one stale log entry is a log entry that is overruled by at least one subsequent log entry.

3. The method of claim 1, wherein the at least one stale log entry is a log entry that is opposed by at least one subsequent log entry.

4. A method, comprising:
performing an operation on a database;
determining whether to perform checkpointing of at least one portion of a node translation table based on a checkpoint threshold;
when it has been determined to perform checkpointing, checkpointing the at least one portion of the node translation table corresponding to at least one node involved in the operation to capture a state of an index;
determining whether to perform garbage collection on a first page by determining whether a percentage of stale entries for the first page satisfies a garbage collection threshold value; and
when it has been determined to perform garbage collection on the first page:
copying fresh content of the first page to a second location;
discarding stale content of the first page;
updating the node translation table with an address for the second location; and
erasing the first page and returning the first page to a storage manager as reclaimed space.

5. The method of claim 4, further comprising supplementing the at least one portion of the node translation table corresponding to the at least one node involved in the operation, including appending a recent log entry to a list corresponding to the at least one node.

6. The method of claim 4, further comprising performing a rollback including loading a previously-checkpointed physical addresses into the node translation table in a memory.

7. The method of claim 6, wherein performing a rollback further includes:
creating new logical addresses in a logical storage at an active physical address and in the node translation table in the memory; and
placing the new logical addresses in the node translation table in the memory.

8. One or more computer readable storage media containing computer-readable instructions that, when executed, perform a method comprising:
performing one or more node level operations on a node;
supplementing a node translation table corresponding to the node;
determining whether to perform log compaction of log entries in the node translation table based on a log compaction threshold of available space on a flash memory device on which the node resides;
when it is determined that log compaction is to be performed, performing log compaction of the log entries, the log compaction including reading all of the log entries for the node and writing the log entries back to a small number of new sectors;
when it is determined that log compaction is not to be performed, determining whether to perform semantic compression of the node translation table corresponding to the node based on a semantic compression threshold on a number of log entries for the node;
when it is determined that semantic compression is to be performed, semantically compressing at least one portion of the node translation table corresponding to the node, the semantic compressing including:
counting a number of stale log entries in a sector;
performing a log garbage collection on the sector when a fraction of the number of stale log entries in the sector is greater than or equal to a threshold value, the log garbage collection including:
discarding at least one log entry that is rendered obsolete by at least one subsequent log entry;
writing at least one fresh log entry to a log buffer;
flushing the at least one fresh log entry from the log buffer to a new location in the flash memory device;
adding a new address, corresponding to the new location, for the at least one fresh log entry to the node translation table;
removing an address for the sector from the node translation table; and
returning the sector to a storage manager as reclaimed space; and
checkpointing of at least one portion of the node translation table, wherein the checkpointing includes replacing one or more sector addresses with one or more corresponding physical addresses, and storing the physical addresses.

9. The computer readable storage media of claim 8, wherein the method further comprises communicating with a flash translation layer to provide a disk-like interface with the flash memory device.

10. The computer readable storage media of claim 8, wherein the method further comprises communicating with the storage manager and with one or more database applications.

* * * * *